United States Patent [19]

Ratzlaff

[11] Patent Number: 4,782,651
[45] Date of Patent: Nov. 8, 1988

[54] BOTTOM LOADING IN-LINE CROP BALER

[75] Inventor: Howard J. Ratzlaff, Hesston, Kans.

[73] Assignee: Hay and Forage Corporation, Hesston, Kans.

[21] Appl. No.: 10,187

[22] Filed: Feb. 2, 1987

[51] Int. Cl.⁴ ............................................. A01D 39/00
[52] U.S. Cl. ......................................... 56/341; 100/189
[58] Field of Search ............. 56/341, 344; 100/188 R, 100/189

[56] References Cited

U.S. PATENT DOCUMENTS

| | | | |
|---|---|---|---|
| 3,522,109 | 7/1970 | Murray et al. | 56/341 |
| 4,034,543 | 7/1977 | Voth et al. | 56/341 |
| 4,157,643 | 6/1979 | White | 56/341 |
| 4,275,550 | 6/1981 | Swenson | 56/341 |
| 4,372,104 | 2/1983 | Simouis | 56/341 |
| 4,524,574 | 6/1985 | Ratzlaff | 56/341 |
| 4,525,991 | 7/1985 | Naaktgeboren | 56/341 |
| 4,569,282 | 2/1986 | Galant | 56/341 |
| 4,604,858 | 8/1986 | Esau et al. | 56/341 |

FOREIGN PATENT DOCUMENTS 2353381  5/1975  Fed. Rep. of Germany ........ 56/341

Primary Examiner—John Weiss
Attorney, Agent, or Firm—Hovey, Williams, Timmons & Collins

[57] ABSTRACT

The baler uses a single stuffer assembly to take crop materials from the center gathering augers of the windrow pickup and sweep such materials upwardly and rearwardly through a loading duct into the baling chamber via an opening in the bottom of the latter. A single set of side-by-side crop engaging forks of the stuffer assembly moves through a generally kidney shaped path of travel that includes extending the forks forward of the deposit zone, plunging the tips of the forks down to the deposit zone between the augers at a point forwardly of the mouth of the duct, sweeping rearwardly and upwardly thereafter through the remainder of the duct along the lower stretch path of fork travel, and the returning downwardly and forwardly along the upper stretch of the path of fork travel to the deposit zone. Such forks are able to extend forward of the deposit zone by positioning the augers, the deposit zone and the mouth of the duct back underneath the axis of rotation of the rotary drive of the forks.

8 Claims, 2 Drawing Sheets

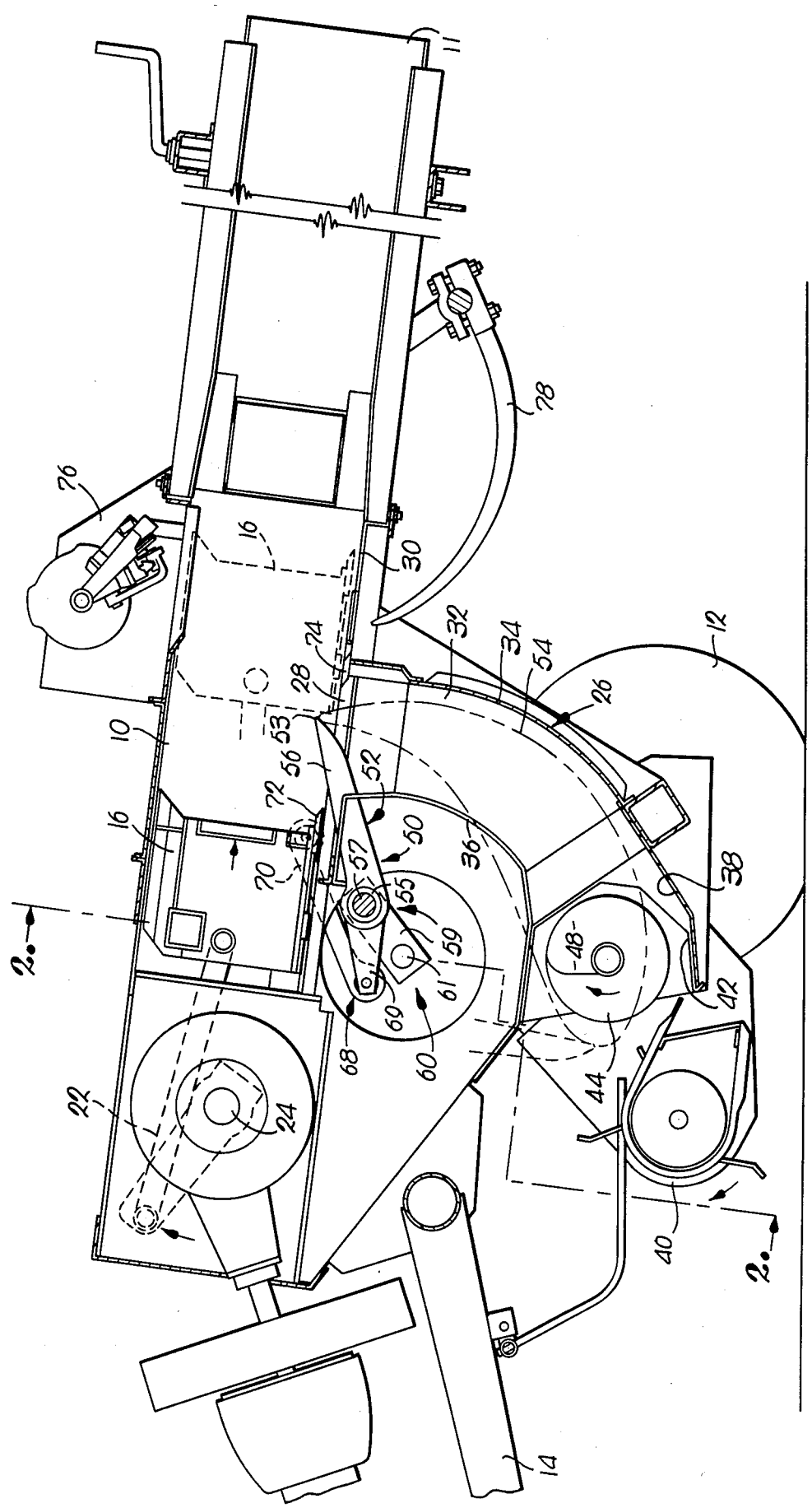

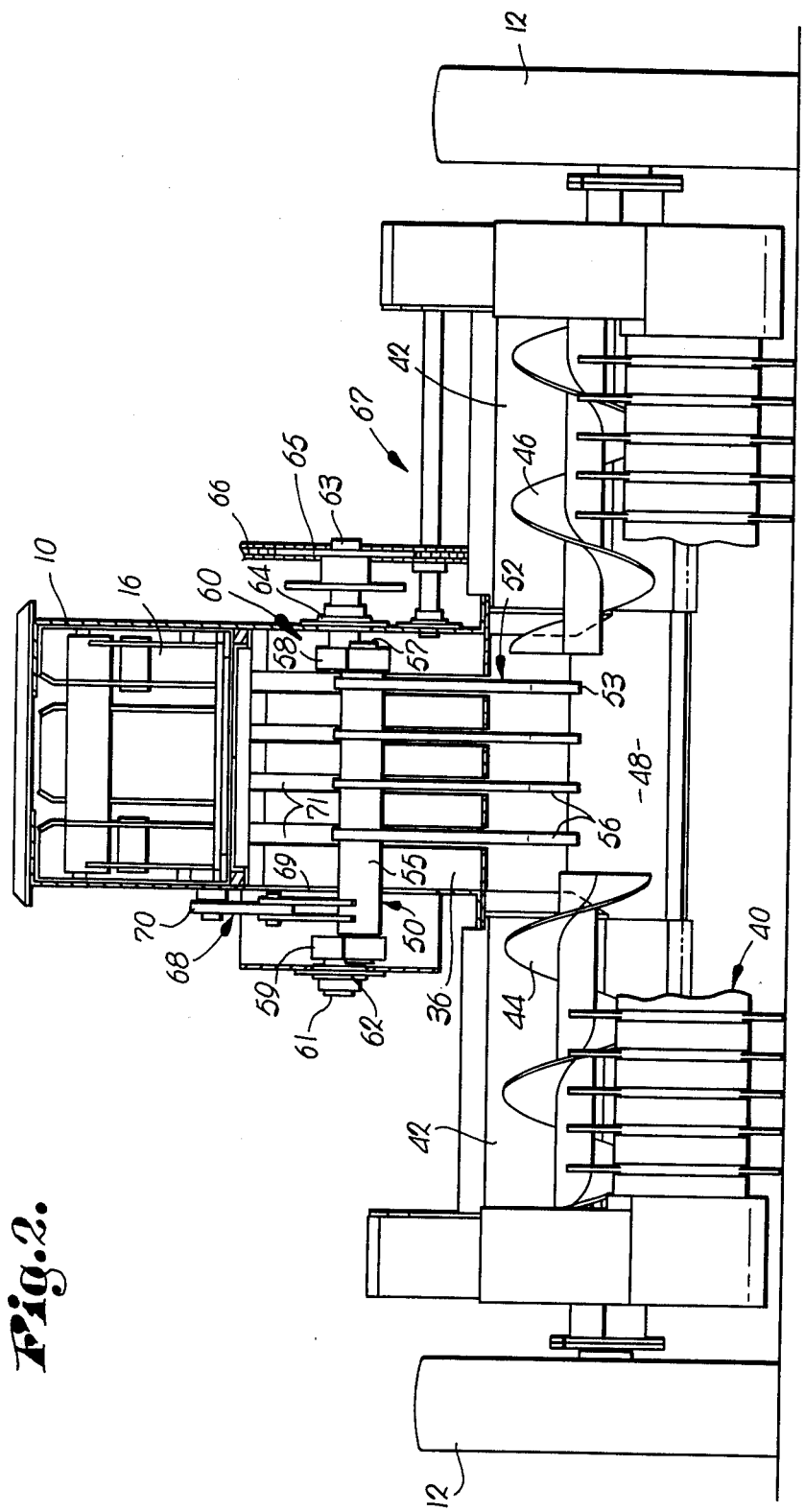

BOTTOM LOADING IN-LINE CROP BALER

FIELD OF THE INVENTION

The present invention generally relates to crop balers of the type which are fed with crop materials up through the bottom of the bale chamber and, more particularly, is concerned with a bottom loading in-line crop baler that has a stuffer assembly that moves through a generally kidney shaped path of travel for loading the baling chamber with successive charges of crop materials.

DESCRIPTION OF THE PRIOR ART

Prior underfed balers have, for the most part, utilized a pair of separate feeder devices for moving crop materials from the discharge point of the crop pickup to the baling chamber itself. For example, in White U.S. Pat. No. 4,157,643, a first rotary device at the mouth end of the loading duct sweeps material into the duct and fills the latter until such time as a second device in the form of a stuffing fork commences its cycle to stuff the charge up into the bottom of the baling chamber.

Similarly, in Swenson et al. U.S. Pat. No. 4,275,550, a first rotary device at the lower mouth end of the duct sweeps material into the open mouth and up into the duct where it is thereupon stuffed up into the bale chamber by a second device in the form of a loading fork.

The baler in Murray U.S. Pat. No. 3,552,109 uses a single stuffing fork to take materials from the pickup and lift the same up through the duct into the bottom of the chamber, but in this machine the stuffer is incapable of loading a charge which extends across the full vertical height of the baling chamber. Instead, each cycle of the stuffer simply adds another small wad of material to those already collected in the bale chamber, each wad being considerably smaller than that which is required to fill the entire area of the chamber vertically and horizontally across the front face of the bale forming therein. The crop package which results from this machine is of relatively low density made up of many discrete, independent wads or bundles of crop materials throughout all areas of the package instead of a series of rectangular, dense "flakes" compacted together along the length of the bale and each of which corresponds in height and width to the internal configurations of the bale chamber.

The baler in Ratzlaff U.S. Pat. No. 4,524,574 also uses a single stuffing fork to take materials from the pickup and lift the same up through the duct into the bottom of the chamber, but this machine requires the use of a cam follower riding within a cam track in order that the single feeder can handle the dual functions of both receiving the materials from the pickup and moving them through a long loading duct into the bale chamber. Although this baler is capable of making high quality crop bales, the cam follower and cam track arrangement are relatively expensive to construct and maintain.

Consequently, a need exists for a single stuffer assembly that is relatively inexpensive to construct and maintain, and that can handle the dual functions of both receiving the crop materials from the pickup and moving the materials through a long loading duct into the bale chamber.

SUMMARY OF THE INVENTION

Accordingly, the present invention provides a bottom loading in-line crop baler designed to satisfy the aforementioned needs and to overcome the aforementioned shortcomings of the prior practices. The present invention provides an under-fed baler capable of making high quality crop bales and utilizing but a single stuffer assembly to deliver successive charges of crop materials from the pickup apparatus to the baling chamber. Furthermore, the stuffer assembly of the present invention is able to utilize a relatively uncomplicated fork, rotary drive and control structure arrangement by positioning the gathering conveyors, deposit zone and entry mouth of the duct back underneath the axis of rotation of the rotary drive of the fork.

BRIEF DESCRIPTION OF THE DRAWINGS

FIG. 1 is a fragmentary side elevational view of a baler constructed in accordance with principles of the present invention, portions thereof being removed for clarity to reveal details of construction, and various phantom lines being utilized to illustrate operating positions of the cooperating components of the baler; and FIG. 2 is a fragmentary transverse cross-sectional view of the baler taken substantially along line 2—2 of FIG. 1.

DETAILED DESCRIPTION

The baler of the present invention includes a long, generally horizontally extending bale chamber 10 of rectangular cross-sectional configuration which is mounted on ground wheels 12 for advancement along a path of travel as determined by a towing vehicle (not shown) connected to the front end of a tongue 14 which projects forwardly from bale chamber 10. As is apparent, the chamber 10 has its longitudinal axis lying in a fore-and-aft direction with respect to normal path of travel of the baler.

A plunger 16 is housed within the chamber 10 for reciprocation in a fore-and-aft direction between a full retracted position illustrated in solid lines and a full extended position denoted by phantom lines. A pitman and crank assembly 22 pivotally coupled with the plunger 16 and fixed to a main transverse drive shaft 24 across the forward end of the bale chamber 10 is operable to drive the plunger 16 in a reciprocating motion.

The bale chamber 10 is spaced above the ground and has a long, tubular loading duct 26 depending therefrom through which crop materials can be conveyed to the bale chamber 10. The duct 26 is at least as long as the chamber is tall, and preferably is on the order of twice the height of the chamber 10. A rectangular opening 28 in the bottom wall or floor 30 of chamber 10 communicates directly with the open upper end of the duct 26 for admitting crop materials into the chamber 10. As illustrated in FIG. 1, the plunger 16 moves back and forth across the opening 28 during its reciprocation.

The duct 26 is generally rectangular in cross section having a pair of opposite sidewalls 32 (only one being shown), a curved bottom wall 34, and a curved, longitudinally slotted top wall 36. The walls 32, 34, and 36 terminate at their forward ends in an open entry mouth 38 which is slightly wider than the bale chamber 10 as a result of a laterally outward flare being imparted to the duct 26 as the mouth thereof is approached.

A crop pickup 40 is spaced forwardly from the mouth 38 generally below the latter and extends transversely outwardly in opposite directions beyond the lateral confines of the duct 26. This is shown for example in FIG. 2, wherein it will be seen that the pickup is substantially wider than the mouth 38 of the duct 26. A pair of transversely extending troughs 42 are disposed immediately rearwardly of the pickup 40 and slightly above the latter. Troughs 42 extend inwardly from the opposite lateral extremes of the pickup 40 and terminate at their inner ends adjacent the mouth 38. A pair of separate conveyors in the form of augers 44 and 46 are disposed within the troughs 42 and rotate about their longitudinal axes for the purpose of conveying crop materials from the outer, lateral reaches of the pickup 40 into the center of the machine in alignment with the mouth 38. The augers 44, 46 are spaced apart at their innermost ends immediately forwardly of the mouth 38 and define a zone of deposit 48 for the crop materials which have been center-gathered thereby. The pickup 40 and the augers 44, 46 may collectively be thought of in a broad sense as apparatus forwardly of the mouth 38 for picking up crop materials from the ground as the baler is advanced and for conveying such materials into the deposit zone 48 for subsequent entry into the duct 26 through the mouth 38.

A stuffer assembly broadly denoted by the numeral 50 is positioned directly above the conveyors 44, 46 and generally below the bale chamber 10 in disposition for taking materials from the zone 48 and sweeping the same up the duct 26 and into the bale chamber 10 in timed relationship with reciprocation of the plunger 16. Such assembly includes a fork 52 whose crop-engaging tip 53 moves in a generally kidney-shaped path of travel 54 during the stuffing action.

The fork 52 is provided with a transverse mounting tube 55 to which are attached a series of four laterally projecting, rigid fingers 56 spaced along the tube 55, the outer ends of the fingers 56 defining the tip 53 of the fork. Tube 55 is in turn rockably received on a transverse shaft 57 which spans and is rigidly affixed at its opposite ends to a pair of crank arms 58 and 59 forming part of a drive 60 for the fork 52.

The right arm 59 (as viewed from the rear of the machine) has a transverse, outwardly extending stub shaft 61 fixed thereto at its rear end which is in turn journalled by bearings 62 for rotation about a transverse axis defined by stub shaft 61. Likewise, the left arm 58 (as viewed from the rear of the machine) has its own transverse, outwardly extending stub shaft 63 fixed thereto at its rear end which is in turn journalled for rotation by bearings 64 about an axis coinciding with that of stub shaft 61. The stub shaft 63 projects further outwardly than stub shaft 61 and has a drive sprocket 65 fixed thereto which is entrained by an endless chain 66 coupled with a power train 67 supplying driving power to the stub shaft 62.

The transverse shaft 57 (and tube 55) is thus driven in a circular path of travel about the axis of stub shafts 61, 63 and in a counterclockwise direction, as viewed in FIG. 1, when the power train 67 is activated. However, the action of the tip 53 is kidney-shaped rather than circular through the presence of control structure broadly denoted by the numeral 68. Such control structure 68 includes a crank 69 rigidly secured to the tube 55 adjacent the right end of the latter and a stiff link 70 pivotally coupled at one end to crank 69 and at the other end to the proximal side of the bale chamber 10 at the point above and rearwardly of the axis of the stub shafts 61, 63. The fingers 56 are disposed for projecting through clearance slots 71 in the top wall 36 of the duct 26 during operation.

The augers 44 and 46, the deposit zone 48, and the mouth 38 of the duct 26 are positioned back underneath the axis of rotation of the rotary drive 60 such that the tip 53 of the fork 52, when in its forwardmost position as illustrated in phantom lines in FIG. 1, is extended forwardly of the deposit zone 48. This relative positioning allows the fork tip 53 to plunge down from its forwardmost position at a point forwardly of deposit zone 48 and the mouth 38 of the duct 26 to insure that a full "bite" of the crop center-gathered by augers 44, 46 is swept into duct 26. Thereafter the fork 52 sweeps rearwardly and upwardly through the remainder of the duct 26 along the lower stretch of the path of travel 54 and advances the charge of crop materials into the baling chamber 10.

A knife 72 is located at the base of plunger 16 along its rearmost edge for cooperating with the stationary knife means 74 located along the rear extremity of the opening 28 to the bale chamber 10.

The baler is also provided with knotter or wire tying mechanism 76 for binding a bale after formation within the chamber 10. It will be appreciated in this respect that such mechanisms may include a set of knotting needles 78 which are normally maintained below the chamber 10 awaiting periodic actuation, at which time they swing upwardly through the bale chamber 10 as a strand of twine or wire is looped through the formed bale.

OPERATION

As the baler is towed along its path of travel, the plunger 16 reciprocates continuously within the bale chamber 10 back and forth across the opening 28 to pack charges of material introduced from the duct 26 against previously compacted materials disposed rearwardly from the opening 28. In this respect, as will be well understood by those skilled in the art, the baler operates in the nature of an extrusion type baler in which a rearmost discharge opening 11 of the bale chamber 10 is constricted with respect to portions upstream therefrom so as to induce a resistance to the rearward movement of bale materials through the chamber 10, thereby causing compaction of each new charge of material introduced into the chamber 10 packed rearwardly by the plunger 16. Although not shown in the drawings, it will be understood by those skilled in the art that suitable retaining hay dogs or the like are used in connection with the bale chamber 10 for holding a freshly compacted charge of materials against retrograde, forward movement after being pressed rearwardly by the plunger 16 to a position behind the opening 28. Thus, the opening 28 is rendered clear and open for the next introduction of a charge from the duct 26.

Upon being lifted off the ground by the pickup 40, the crop materials encounter the center gathering augers 44, 46 and are moved inwardly along the troughs 42 until reaching the deposit zone 48 immediately in advance of the entry mouth 38 of the duct 26. The augers 44, 46 are rotated in a manner about their longitudinal axis so as to carry crop materials along their top surfaces, thus facilitating engagement by the fork 52 when the materials reach zone 48. Due to forward ground travel of the baler and the momentum of those incoming crops located in the center of pickup 40, the centered materials move directly into the mouth 38 and begin to accumulate within the duct 26 itself. There they remain for the short time it takes for the fork 52 to complete a previous revolution and sweep downwardly through zone 48.

As a result of the special relationship between the deposit zone 48 of augers 44, 46 and the overhead stuffer, assembly 50, i.e., the deposit zone 48 is directly below shaft 61 of the drive for stuffer 50, a considerably less complicated and less costly stuffer can be utilized than the stuffer of U.S. Pat. No. 4,524,574. Yet, performance of the baler remains at an acceptably high level so that properly shaped and densified bales are produced by the machine.

I claim:

1. A crop baler comprising:
 a generally horizontally disposed baling chamber extending in a fore-and-aft direction with respect to the path of travel of the baler;
 a plunger mounted for reciprocation within said chamber in said fore-and-aft direction,
 said chamber having an entrance opening in a lower wall thereof over which said plunger passes during said reciprocation;
 a tubular loading duct depending from said chamber with its upper end in direct communication with said opening and having a length which is at least as great as the vertical dimension of said chamber.
 said duct curving downwardly and forwardly from said opening, having a longitudinally slotted top wall and terminating in a forwardmost end defining an open, crop-receiving mouth;
 apparatus forwardly of said duct for picking up crop material from the ground as the baler moves along said path of travel;
 conveying means adapted to receive picked up crop materials in locations laterally outboard of the opposite lateral confines of said mouth and to converge the same inwardly to a point aligned fore-and-aft with the mouth,
 said conveying means including a pair of axially aligned and axially spaced augers rotatable about a common transverse axis and presenting inner ends disposed adjacent said opposite confines of the mouth to define a deposit zone immediately in front of the mouth; and
 a stuffer assembly directly above said augers and operable to load the baling chamber with successive charges of crop materials from said mouth of the duct in timed relation to reciprocation of the plunger,
 said stuffer assembly including a fork, a continuously rotating drive shaft positioned beneath said baling chamber, a crank arm on said drive shaft pivotally coupled with the fork for driving the latter, and control structure connected to the fork in a manner to cause a crop-engaging tip of the fork to move through the duct in a generally kidney-shaped path of travel during each stuffing cycle of the fork,
 said axis of rotation of the augers, said deposit zone and said mouth of the duct being positioned back underneath said drive shaft in generally vertical alignment therewith such that the tip of the fork initially plunges down to the deposit zone at a point forwardly of the mouth of the duct, sweeps rearwardly and upwardly thereafter through the remainder of the duct along the lower stretch of its path of travel and to a location above said drive shaft, and then returns downwardly and forwardly along the upper stretch of its path of travel to the deposit zone.

2. The baler as claimed in claim 1, wherein each of said augers is rotatable in such a direction that it conveys materials along the top thereof.

3. A crop baler as claimed in claim 1, wherein the path of travel of the tip of the fork loops forwardly around the axis of the augers such that the tip of the fork extends forward of the deposit zone immediately prior to plunging down to the deposit zone.

4. A crop baler as claimed in claim 3, wherein the path of travel of the tip of the fork projects a short distance up into the baling chamber such that the plunger wipes the charge off the fork during rearward movement of the plunger.

5. A crop baler as claimed in claim 1, wherein the path of travel of the tip of the fork projects a short distance up into the baling chamber such that the plunger wipes the charge off the fork during rearward movement of the plunger.

6. A crop baler as claimed in claim 1, wherein said control structure includes a link having one end pivotally connected to said fork for movement with the fork during operation of the latter and an opposite end pivotally anchored to the baler against such movement, said opposite, anchored end of the link being disposed above said drive shaft and rearwardly thereof with respect to the normal direction of travel of the baler.

7. A crop baler as claimed in claim 6, wherein the path of travel of the tip of the fork loops forwardly around the axis of the augers such that the tip of the fork extends forward of the deposit zone immediately prior to plunging down to the deposit zone.

8. A crop baler as claimed in claim 7, wherein the path of travel of the tip of the fork projects a short distance up into the baling chamber such that the plunger wipes the charge off the fork during rearward movement of the plunger.

* * * * *